US008607348B1

(12) United States Patent
Satish et al.

(10) Patent No.: US 8,607,348 B1
(45) Date of Patent: Dec. 10, 2013

(54) PROCESS BOUNDARY ISOLATION USING CONSTRAINED PROCESSES

(75) Inventors: Sourabh Satish, Fremont, CA (US); Mark Kevin Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1053 days.

(21) Appl. No.: 12/240,711

(22) Filed: Sep. 29, 2008

(51) Int. Cl.
G06F 21/00 (2013.01)

(52) U.S. Cl.
USPC .............................. 726/24; 726/23

(58) Field of Classification Search
USPC ...................................... 726/24, 23
See application file for complete search history.

(56) References Cited

U.S. PATENT DOCUMENTS

| 7,559,086 B2 * | 7/2009 | Sobko et al. ............ 726/24 |
| 7,594,272 B1 | 9/2009 | Kennedy et al. |
| 2006/0161982 A1 * | 7/2006 | Chari et al. ............ 726/23 |

* cited by examiner

Primary Examiner — Andrew Georgandellis
(74) Attorney, Agent, or Firm — Fenwick & West LLP

(57) ABSTRACT

A system, method, and computer program product for detecting malware in a software package on a computer having an operating system is disclosed. A software package can include various files and processes. A process monitoring module monitors a process associated with the software package and detects when the monitored process requests access to a system process or other operating system object. A constrained process manager provides a constrained object to the monitored process in response to the request. The constrained object generally has less access to computer system resources than the system process. A malware detection module then observes interactions between the monitored process and the constrained object and determines whether the monitored process contains malware based on these interactions.

21 Claims, 4 Drawing Sheets

PROCESS BOUNDARY ISOLATION USING CONSTRAINED PROCESSES

BACKGROUND

1. Field of the Invention

This invention pertains in general to protecting a computer from malicious software and in particular to techniques for isolating files and processes from the rest of a computer system.

2. Description of the Related Art

Software that possibly contains malicious software, or malware, can be installed and executed on a computer. For example, a user may download software from a website and install it on the computer, or the user may receive an executable file in an email attachment and execute it on the computer. The user may think the software is safe, when in fact the software contains malware that harms the user's system by infecting it with a virus or by destroying data, for example.

The execution of the software program can be observed to determine whether it performs any malicious activities. However, by the time the software program has been observed to perform malicious activities, the operating system, file system, or user applications of the computer may have already been harmed by the malicious activities. Therefore, there is a need in the art for a way to observe the execution of a software program to determine whether it contains malware, without allowing the software program to damage the computer in the event that it does contain malware.

BRIEF SUMMARY OF THE INVENTION

The above need is met by a system, method, and computer program product for detecting malware in a software package on a computer having an operating system. A software package can include various files and processes. A process monitoring module monitors a process associated with the software package and detects when the monitored process requests access to a system process or other operating system object. A constrained process manager provides a constrained object to the monitored process in response to the request. The constrained object generally has less access to computer system resources than the system process. A malware detection module then observes interactions between the monitored process and the constrained object and determines whether the monitored process contains malware based on these interactions.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
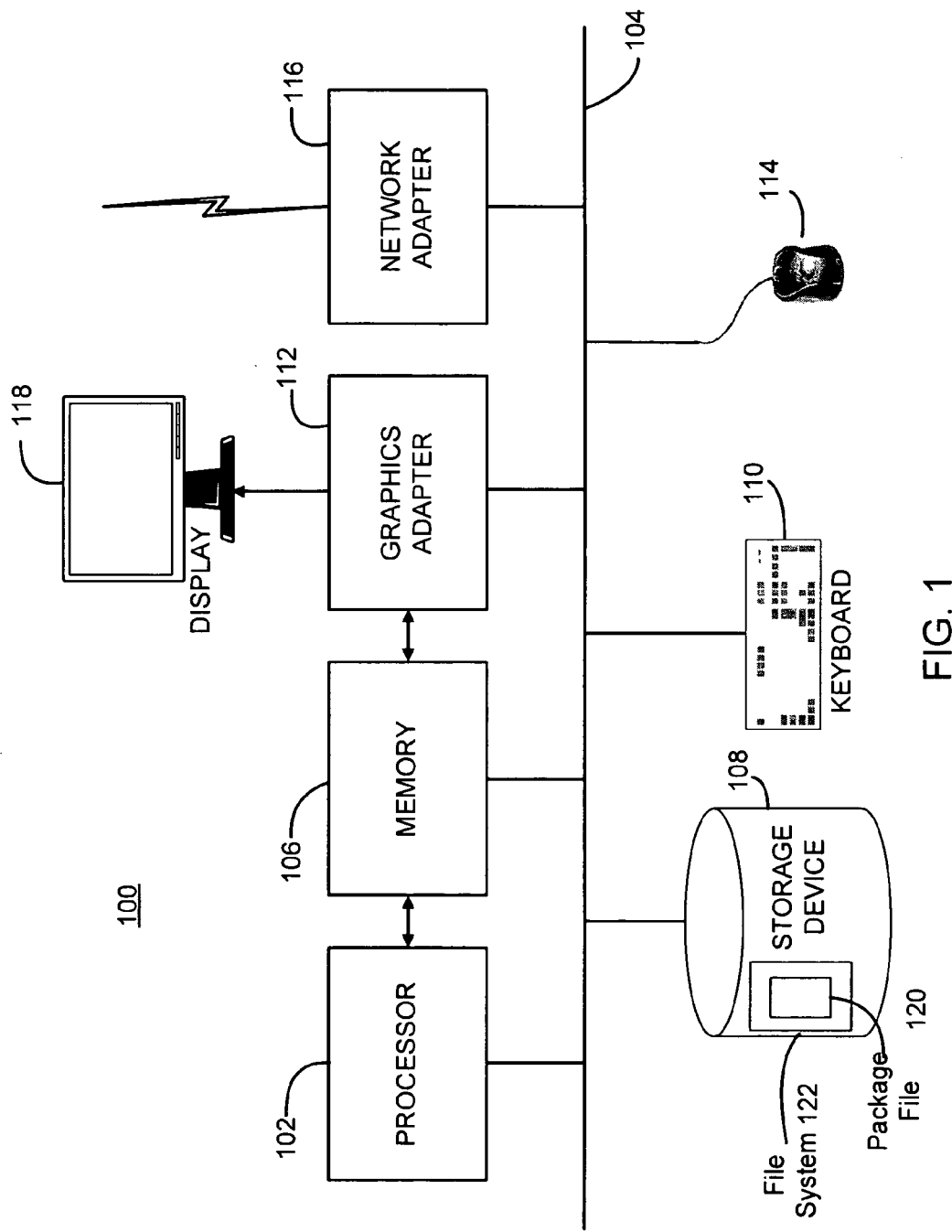
FIG. 1 is a high-level block diagram illustrating a computer configured to isolate and detect malware in a software package, in one embodiment.

FIG. 1 is a high-level block diagram illustrating a computer 100 configured to isolate and detect malware in a software package, in one embodiment. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112. The storage device 108 is a device such as a hard drive, CD or DVD drive, or flash memory device, and holds files containing executable code and/or data utilized during the operation of the computer 100. The memory 106, in one embodiment, is a random access memory (RAM) and holds instructions and data loaded from the storage device 108, generated during processing, and/or from other sources.

The storage device 108 contains files organized in a file system 122, in one embodiment. The file system 118 can be, for example the New Technology File System (NTFS) used by some versions of MICROSOFT WINDOWS or the third extended file system (ext3) used by some versions of LINUX. Some files in the file system 122 are package files 120. The package files 120 include files associated with a software package or software application. For example, the package files 120 may comprise files created by an installation program for a software package or files created by the software package during its execution.

Computers acting in different roles may have different and/or additional elements than the ones shown in FIG. 1. For example, a computer 100 acting as a server may have greater processing power and a larger storage device than a computer acting as a client. Likewise, a computer 100 acting as a server may lack devices such as a display 118 and/or keyboard 110 that are not necessarily required to operate it.

The computer 100 executes one or more operating systems such as a variant of MICROSOFT WINDOWS or LINUX. In general, the operating system executes one or more application programs. The operating system and application programs executed by the computer are formed of one or more processes. This description utilizes the term "module" to refer to computer program logic for providing a specified functionality. A module can be implemented in hardware, firmware, and/or software. A module is typically stored on the storage device 108, loaded into the memory 106, and executed by the processor 102. A module can include one or more processes, and/or be provided by only part of a process.

Figure 2:
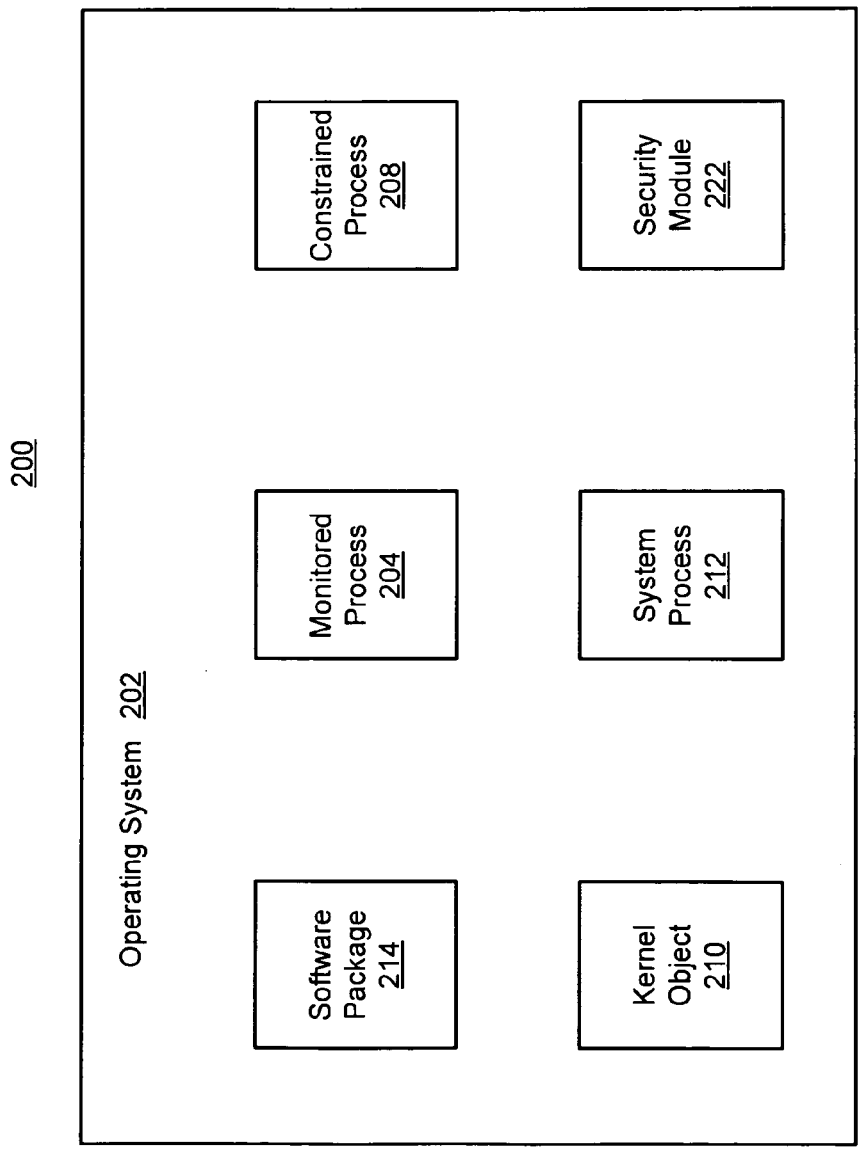
FIG. 2 illustrates a logical view of a computing environment provided by a processor and software for isolating and detecting malware in a software package, in one embodiment.

FIG. 2 illustrates a logical view of a computing environment 200 provided by a processor 102 and software for isolating and detecting malware in a software package, in one embodiment. The environment 200 includes an operating system 202 that runs a security module 222. The security module 222 runs in the operating system 202 but is not necessarily a part of the operating system. The security module 222 can be a separate application or part of another application. Other embodiments can have different and/or additional entities. In addition, the functionalities can be distributed among the entities in a different manner than is described above.

The operating system 202 is a standard operating system such as WINDOWS VISTA or LINUX. The operating system 202 includes system processes 212 that perform various functions for the operating system 202 and provide various services to user applications. Malware often target system processes 212. Since many system processes 212 normally run continuously, it is difficult to determine when malware has taken over a system process or has injected malicious code into a system process. Also, system processes 212 may be targeted by malware because system processes often operate with administrator privileges and give the malware full read and write access to the operating system 202.

The operating system 202 also contains kernel objects 210. These include, for example, semaphores, mutexes, handles, and sockets. In one embodiment, system processes 212 are also types of kernel objects 210. Semaphores and mutexes are objects that can be used control a thread of execution within a process or that can be used to synchronize threads of execution. Handles can be used to write to memory locations, storage device locations, or to control various operating system objects or user objects. Sockets can be used to write to data communication channels used for interprocess communication or communication over a network. These kernel objects 210 are often used by malware to perform malicious activities on the computer 100.

The software package 214 comprises a set of package files 120 that are related to each other. The package files 120 of a software package 214 may have been introduced to the computer 100 from the same source. For example, a ZIP file or Windows Installer file may have been downloaded from a website. Initially, this file is the only package file 120 of the new software package 214. Once this file is processed using an appropriate unpacking utility, the resulting unpacked files also become package files 120 of the software package 214. Examples of software packages 214 include user applications and utilities. Package files 120 may include executable files, library files, configuration files, and data files. The package files 120 associated with a software package 214 may change as the software package is executed and files are created and deleted. Initially, it may not be known whether the software package 214 contains malware. For example, the software package 214 may have been downloaded from an untrusted web page or received as an email attachment from an untrusted source.

The security module 222 detects the presence of malware in a software package 214, in one embodiment. The security module 222 can also prevent the malware from harming the computer 100, prevent the malware from spreading beyond the software package 214, and remove the malware from the computer 100. In one embodiment, the security module 222 tracks the package files 120 associated with a software package 214. The security module 222 also tracks processes associated with the package files 120, including monitored processes 204 and constrained processes 208, described further below. By tracking the package files 120 and processes associated with a software package 214, the security module 222 can detect the presence of malware in the software package and prevent it from harming the computer 100.

Figure 3:
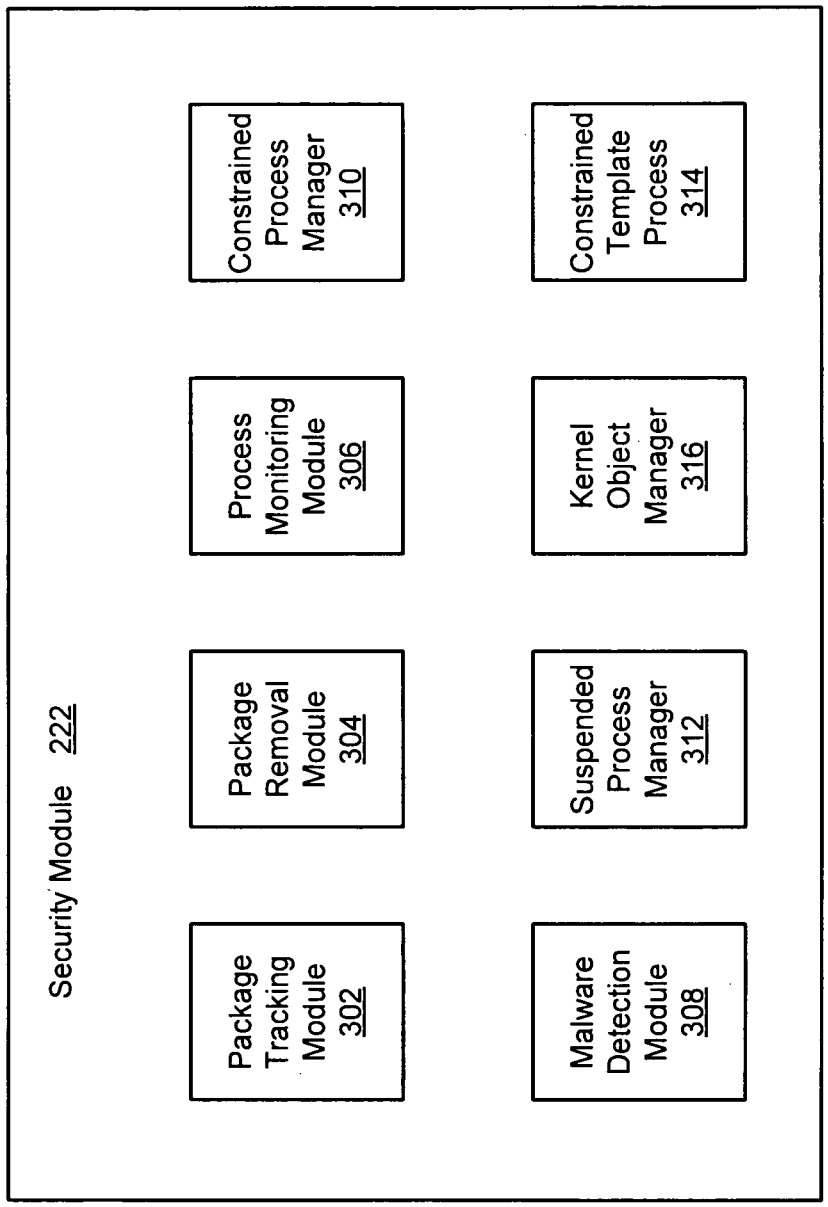
FIG. 3 illustrates a logical view of the security module, in one embodiment.

FIG. 3 illustrates a logical view of the security module 222, in one embodiment. The package tracking module 302 keeps track of the package files 120 associated with a software package 214. The package tracking module 302 can monitor the file system 122 for any new software packages 214 that are introduced to the computer 100 from untrusted sources (e.g., from email attachments or unknown websites, as mentioned above). The package tracking module 302 can then maintain a list or other data structure for keeping track of the package files 120 associated with the software package 214. The package tracking module 302 can keep track of all package files 120 or only specific types of files, such as executable files or library files.

Package files 120 can be created when a software package 214 is installed with an installer program or unpacked with a file archiving program. New package files 120 can also be created from existing package files being executed, unpacked, or otherwise processed. The package tracking module 302 can monitor existing package files 120 to track the creation of new package files and add those files to a list of tracked files. As a result, the package tracking module 302 is able to track the spread of a software package 214 on the file system 122. In one embodiment, the package tracking module 302 comprises the Altiris Software Virtualization Solution by Symantec Corporation.

The process monitoring module 306 can monitor the processes associated with a software package 214. These processes are referred to here as monitored processes 204. The process monitoring module 306 can receive, from the package tracking module 302, a list of package files 120 associated with a software package 214 and monitor those files for execution or use by executing processes. The process monitoring module 306 can maintain a list, similar to the package tracking module 302, of monitored processes 204 of a software package 214. For example, the process monitoring module 306 can determine when a package file 120 is executed as a process and can add the newly created process to its list of monitored processes 204.

The process monitoring module 306 can also determine if an existing (possibly unmonitored) process accesses package files 120, such as libraries, of a software package 214. The existing process can then become a monitored process 204 of the software package 214, since it may be executing code or using data from the software package. The process monitoring module 306 can also determine when a monitored process 204 creates a new process, and can add the new process to its list of monitored processes for the software package 214. These new processes are also referred to as "sibling" processes.

As mentioned above, the software package 214 may include malware. As a result, the monitored processes 204 may also contain malware and may attempt to perform malicious activities. A monitored process 204 with malware may use system processes 212 or other kernel objects 210 to perform malicious activities. For example, a monitored process 204 may request write access to a system process 212, and if successful, may inject malware into the system process 212. The injected malware may then perform malicious activities from within the system process 212, where it can cause significant harm to the computer 100 and be difficult to detect.

One way to prevent monitored processes 204 from using system processes 212 for malicious purposes is to limit their access to system processes 212. In one embodiment, the process monitoring module 306 determines when a monitored process 204 requests access to a system process 212. This can be detected when the monitored process 204 calls certain operating system functions, such as OpenProcess( ). The process monitoring module 306 can be configured to intercept such function calls.

The process monitoring module 306 can analyze an intercepted function call to determine whether the monitored process 204 is requesting read-only access or writeable access. If the monitored process 204 is requesting read-only access, then the process monitoring module 306 can provide the actual system process 212 to the monitored process, since the monitored process will likely be unable to use the system process for malicious purposes. If the monitored process 204 is requesting writeable access on the other hand, then the process monitoring module 306 can notify the constrained process manager 310 and the constrained process manager can provide a constrained process 208 to the monitored process 204 rather than providing an actual system process 212.

The process monitoring module 306 can also determine when a monitored process 204 requests access to an existing user process. The process monitoring module 306 can give the monitored process 204 access to the existing user process and add the existing user process to the list of monitored processes for the software package 214 as a sibling process.

The constrained process manager 310 creates and manages constrained processes 208. In one embodiment, the security module 222 maintains a constrained template process 314 that is a "dummy" process that does not necessarily perform any specific function. The constrained process manager 310 can create a constrained process 208 as a substitute for a system process 212 by making a copy of the constrained template process 314 and possibly modifying the copy to match certain features of the system process 212, as described below. Unlike the actual system process 212, the constrained process 208 is not important to the functioning of the operating system 202 and does not provide access to sensitive operating system resources.

By providing a constrained process 208 to a monitored process 204 rather than the requested system process 312, the constrained process manager 310 reduces the risk of damage to the computer 100 by malicious activities of the monitored process 204. In one embodiment, the constrained process 208 is set to run at with user-level privileges and may be assigned a special user security identifier (SID). The special SID may correspond to a previously created user account, so that assigning the constrained process 208 the SID automatically limits the access capabilities of the constrained process. The monitored process 204 can be given writeable access to the constrained process 208. New copies of the constrained template process 314 can be made when needed to provide new constrained processes 208 to requesting monitored processes 204.

It may be desirable to allow a monitored process 204 to execute normally until the malware detection module 308, further described below, has determined whether the monitored process contains malware. By providing a constrained process 208 to the monitored process 204 instead of the requested system process 212, the normal execution of the monitored process may be disrupted. For example, the monitored process 204 may have been expecting the constrained process 208 to include certain functionality that is present in the requested system process 212. When the monitored process 204 attempts to use this functionality, possibly for legitimate purposes, the monitored process may fail and terminate prematurely or execute abnormally after that point. As a result, the malware detection module 308 may not be able to observe enough behavior of the monitored process 204 to determine whether it contains malware.

The constrained process manager 310 can modify constrained processes 208 so that they more closely resemble the system processes 212 they are replacing, while still preventing malware in the monitored processes 204 from harming the computer 100. After creating a constrained process 208 by making a copy of the constrained template process 314, the constrained process manager 310 can change the name of the constrained process 208 to match the name of the system process 212 that the monitored process requested. The constrained process manager 310 can also change various other properties of the constrained process 208 to match the properties of the system process 212. As a result, the monitored process 204 is less likely to fail when given the constrained process 208 instead of the system process 212.

The constrained process manager 310 can include limited functionality in a constrained process 208, such as a subset of the functionality of the requested system process 212. This may reduce the chance that a monitored process 204 will fail when attempting to use the constrained process 208. For example, if the monitored process 204 requests a system process 212 that is a Component Object Model (COM) server, the constrained process manager 310 can included limited COM server functionality in the provided constrained process 208. This limited functionality may include, for example, the expected COM server interfaces, but not the actual data that would be provided by a COM server in the requested system process 212. This limited functionality may be sufficient to allow the monitored process 204 to continue normal or approximately normal execution.

The constrained process manager 310 can emulate the address space layout of the actual system process 212 in the constrained process 208 to further enable the monitored process 204 to continue execution. For example, the monitored process 204 may attempt to jump to an arbitrary location in the memory of the constrained process 208 and begin executing code at that location. The constrained process manager 310 can provide exception handler mechanisms that catch such attempts and return the execution to clean return stub functions. These types of attempts are often made when the monitored process 204 contains malware and is attempting to run injected code in a system process 212. In this case, the injected code will be able to run as long as possible, enabling malicious behavior to be better detected.

The constrained process manager 310 can also update existing constrained processes 208 based on the behavior of their corresponding system processes 212. This can further decrease the likelihood that a monitored process 204 will fail because of differences between constrained processes 208 and system processes 212. For example, when a system process 212 terminates, the corresponding constrained processes 208 can be terminated. Similarly, when a system process 212 spawns a new process, the corresponding constrained processes 208 can spawn a new process. The new processes can also be a constrained process 208 that is modified to be similar to the new system process 212.

In many cases, when a monitored process 204 requests access to a system process 212, it does not intend to use the functionality of the system process. Rather, the monitored process 204 may want to merely check for the existence of the system process 212 or may want to enumerate the currently running system processes. In such cases, the monitored process 204 should request read-only access to the system process 212, and the actual system process 212 can be provided without endangering the computer 100. However, the monitored process 204 may inadvertently request writeable access to the system process 212, for example due to a programming error in the software package 214 code. In this case, providing a constrained process 208 with minimal functionality can maintain system security without disrupting the monitored process 204.

In one embodiment, a kernel object manager 316 is notified when a monitored process 204 requests access to kernel objects 210 other than system processes 212. The kernel object manager 316 can provide constrained kernel objects to the monitored process 204 instead of the actual kernel objects 210, similar to the constrained process manager 310 providing constrained processes 208 instead of system processes 212. For example, a monitored process 204 may request a file handle for writing to a sensitive area of the storage device 108. The kernel object manager 316 may instead provide a dummy file handle that merely discards data written to it. The kernel object manager 316 may provide limited functionality in the constrained kernel objects and may update the constrained kernel objects based on changes to the actual kernel objects 210, similar to the constrained process manager 310.

In one embodiment, the suspended process manager 312 is notified when a monitored process 204 requests access to a system process 212. The suspended process manager 312 can make a copy of the requested system process 212, permanently suspend the process, remove the administrative privileges of the process, and provide the permanently suspended process to the requesting monitored process 204. Unlike the approach described above using the constrained process manager, an actual copy of the system process 212 is provided to the monitored process 204. Since the process is permanently suspended, it cannot be used to harm the computer by malware present in the monitored process 204. In some cases, providing a suspended process may better enable the monitored process 204 to continue normal execution than providing a constrained process 208. For example, malicious code injection by a monitored process 204 may work better on a suspended process than a constrained process 208, allowing the malicious behavior to be better observed by the malware detection module 308.

The malware detection module 308 detects the presence of malware in the software package 214, in one embodiment. The malware detection module 308 can detect the presence of malware in the package files 120 of a software package 214 using methods such as scanning the files for viruses. The scan can be performed on a file when the file is added to the list of package files 120 for the software package 214 by the package tracking module 302. Package files 120 can also be scanned after they are modified.

The malware detection module 308 also detects the presence of malware in the monitored processes 204 by observing their behavior while they are executing. The malware detection module 308 can look for various types of behavior that indicate that the monitored process 204 is attempting to perform a malicious activity. These behaviors include attempts to write to certain operating system files and attempts to access system processes 212 or other processes that a legitimate process normally would not access. Another behavior indicating the presence of malware is a monitored process 204 attempting to inject executable code into another process. This can be done to hide malware in a system process 212 or to replicate malware, for example.

The use of constrained processes 208, suspended processes, and constrained kernel objects as described above is useful for detecting the presence of malware. With these objects, a monitored process 204 can be allowed to execute and its behavior can be observed by the malware detection module 308, but the monitored process is not able to cause actual harm to the computer while the observation is taking place. For example, a monitored process 204 may inject malicious code into a constrained process 208 and then execute the malicious code. This can be detected by the malware detection module 308, and the monitored process 204 can be deemed malware. Also, since the constrained process 208 is not an actual system process 212, the executed injected code does not harm the computer 100.

If the malware detection module 308 detects malware in a package file 120 or monitored process 204, the malware detection module can take remedial actions such as displaying an alert to a user of the computer 100 or halting the monitored process. If malware is detected in a package file 120 or monitored process 204 of a software package 214, the rest of the software package may also contain malware. Even if the rest of the software package 214 does not contain malware, the software package 214 may not be able to function properly without the component that contains malware. In this case, the software package 214 may be tagged for removal.

The package removal module 304 can remove a software package 214 from the computer 100 if a component of the software package has been found to contain malware. The package removal module 304 can stop all running monitored processes 204 and constrained processes 208 associated with a software package 214. The package removal module 304 can then remove the package files 120 associated with the software package 214 from the file system 122. The package removal module can obtain a list of package files 120, monitored processes 204, and constrained processes 208 from the package tracking module 302, process monitoring module 306, and constrained process manager 310.

In one embodiment, the malware detection module 308 can also determine that a monitored process 204 is adequately safe after observing the behavior of the monitored process. If the malware detection module 308 determines that the monitored process 204 has not performed any suspicious activities after a certain amount of observation, then the monitored process can be deemed adequately safe. The amount of observation required can be, for example, a predetermined amount of execution time or a predetermined number of (legitimate) requests for kernel objects 210 or system processes 212. The amount of observation required can also be based on various heuristics.

In one embodiment, if the monitored processes 204 of a software package 214 are deemed safe, then the software package is deemed safe by the malware detection module 308. A software package 214 that has been deemed safe can then be treated as trusted software. The software package 214 can be run without further package tracking or process monitoring, and actual system processes 212 can be provided to the processes of the software package 214 when requested.

Figure 4:
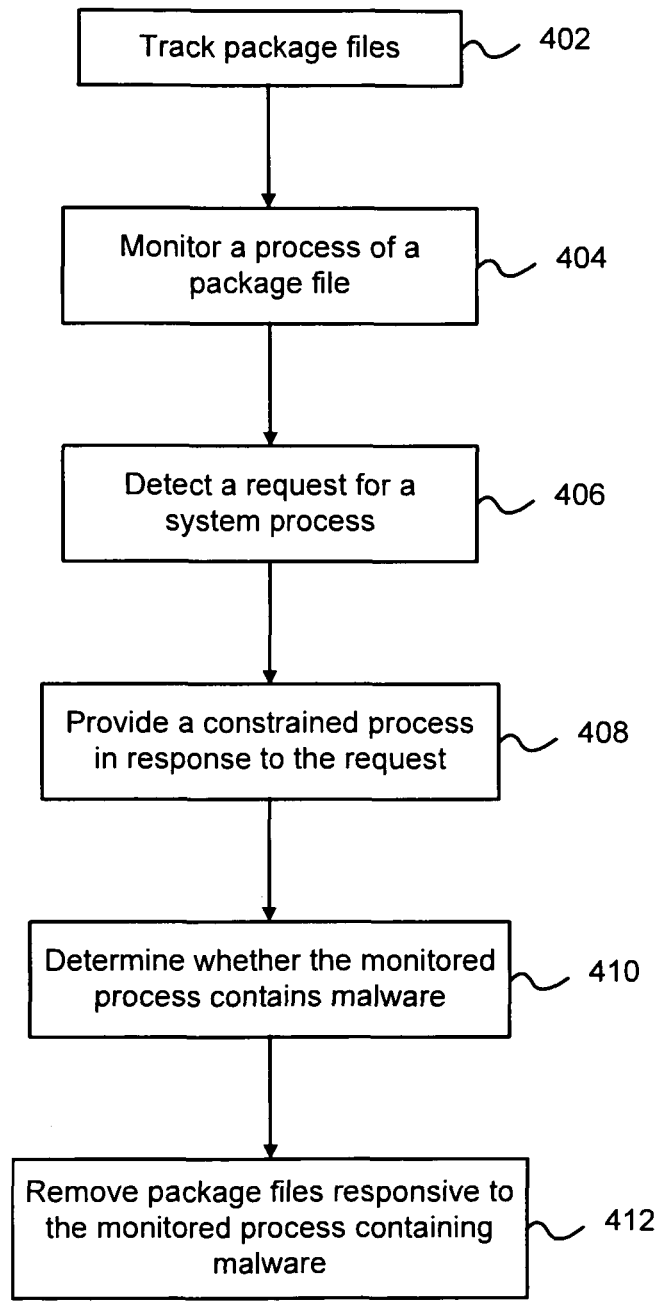
FIG. 4 is a flowchart illustrating a method for isolating and detecting malware in a software package, in one embodiment.

FIG. 4 is a flowchart illustrating a method for isolating and detecting malware in a software package 214, in one embodiment. The package tracking module 302 tracks 402 package files 120 of a software package 214. The process monitoring module 306 monitors 404 the processes 204 launched from package files 120 of the software package 214. Monitored processes 204 can also include processes from other sources that have accessed package files 120 during their execution. The process monitoring module 306 detects 406 a request from a monitored process 204 for a system process 212. This can be done by intercepting various system calls used for requesting system processes 212.

The process monitoring module 306 notifies the constrained process manager 310 of the request, and the constrained process manager creates a constrained process 208 and provides 408 the constrained process to the monitored process 204 in response to the request. A suspended process manager 312 can also provide a suspended process in response to the request. The constrained process 208 can enable the monitored process 204 to continue execution without exposing the computer 100 to possible damage by malware in the monitored process 204. The malware detection module 308 observes the execution of the monitored process 204 and determines 410 whether the monitored process contains malware. Responsive to the monitored process 204 containing malware, the package removal module 304 can remove 412 package files 120 of the software package 214 from the computer 100.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer system for detecting malware in a software package on the computer system, comprising:
a non-transitory computer-readable storage medium storing executable computer program modules comprising:
a process monitoring module for monitoring a set of processes associated with the software package, the monitoring comprising detecting when a monitored process in the set requests access to a system process, the process monitoring module further for adding to the set of monitored processes a user process created or accessed by the monitored process;
a constrained process manager for:
creating a constrained process in response to the request to access the system process by modifying a constrained template process, the modification comprising modifying an address space of the constrained template process to emulate an address space of the system process;
providing the constrained process to the monitored process in response to the request, the constrained process having less access to computer system resources than the system process;
detecting a behavior of the system process;
updating the constrained process responsive to the detected behavior of the system process; and
a malware detection module for observing monitored process interactions with the address space of the constrained process and for determining whether the monitored process contains malware based at least in part on the observed interactions.

2. The computer system of claim 1, wherein the process monitoring module is further configured for determining whether the requested access comprises writeable access, and wherein the constrained process manager is further configured for providing the constrained process to the monitored process responsive at least in part to the requested access comprising writeable access, and wherein the constrained process manager is further configured for providing the system process to the monitored process responsive at least in part to the requested access comprising read-only access.

3. The computer system of claim 1, further comprising:
a package tracking module for determining package files, the package files being associated with the software package, wherein a file created at least in part by a package file is deemed a package file;
and wherein the monitored process comprises a process that executes code from a package file.

4. The computer system of claim 1, wherein the constrained process includes a subset of the functionality of the system process.

5. The computer system of claim 1, wherein determining whether the monitored process contains malware further comprises:
detecting the monitored process injecting code into the address space of the constrained process; and
determining that the monitored process contains malware responsive at least in part to the detection.

6. The computer system of claim 1, wherein the process monitoring module is further configured for detecting when a monitored process requests access to a kernel object, and further comprising:
a kernel object manager for providing a constrained kernel object to the monitored process in response to a request for a kernel object, the constrained kernel object having less functionality than the kernel object.

7. The computer system of claim 1, further comprising:
a suspended process manager for providing a suspended process to the monitored process in response to the request, the suspended process being a suspended copy of the system process.

8. The computer system of claim 1, wherein the constrained process manager is further configured for updating the status of the constrained process responsive to status changes in the system process.

9. A non-transitory computer-readable storage medium having executable computer program modules for detecting malware in a software package on a computer, comprising:
a process monitoring module for monitoring a set of processes associated with the software package, the monitoring comprising detecting when a monitored process in the set requests access to a system process, the process monitoring module further for adding to the set of monitored processes a user process created or accessed by the monitored process;
a constrained process manager for:
creating a constrained process in response to the request to access the system process by modifying a constrained template process, the modification comprising modifying an address space of the constrained template process to emulate an address space of the system process;
providing the constrained process to the monitored process in response to the request, the constrained process having less access to computer system resources than the system process;
detecting a behavior of the system process;
updating the constrained process responsive to the detected behavior of the system process; and
a malware detection module for observing monitored process interactions with the address space of the constrained process and for determining whether the monitored process contains malware based at least in part on the observed interactions.

10. The computer-readable storage medium of claim 9, wherein the process monitoring module is further configured for determining whether the requested access comprises writeable access, and wherein the constrained process manager is further configured for providing the constrained process to the monitored process responsive at least in part to the requested access comprising writeable access, and wherein the constrained process manager is further configured for providing the system process to the monitored process responsive at least in part to the requested access comprising read-only access.

11. The computer-readable storage medium of claim 9, further comprising:
a package tracking module for determining package files, the package files being associated with the software package, wherein a file created at least in part by a package file is deemed a package file;
and wherein the monitored process comprises a process that executes code from a package file.

12. The computer-readable storage medium of claim 9, wherein determining whether the monitored process contains malware further comprises:
detecting the monitored process injecting code into the address space of the constrained process; and
determining that the monitored process contains malware responsive at least in part to the detection.

13. The computer-readable storage medium of claim 9, wherein the process monitoring module is further configured for detecting when a monitored process requests access to a kernel object, and further comprising:

a kernel object manager for providing a constrained kernel object to the monitored process in response to a request for a kernel object, the constrained kernel object having less functionality than the kernel object.

14. The computer-readable storage medium of claim 9, further comprising:
a suspended process manager for providing a suspended process to the monitored process in response to the request, the suspended process being a suspended copy of the system process.

15. A computer-implemented method for detecting malware in a software package on a computer, comprising:
monitoring a set of processes associated with the software package, the monitoring comprising detecting when a monitored process in the set requests access to a system process;
adding to the set of monitored processes a user process created or accessed by the monitored process;
creating a constrained process in response to the request to access the system process by modifying a constrained template process, the modification comprising modifying an address space of the constrained template process to emulate an address space of the system process;
providing the constrained process to the monitored process in response to the request, the constrained process having less access to computer system resources than the system process;
detecting a behavior of the system process;
updating the constrained process responsive to the detected behavior of the system process; and
observing monitored process interactions with the address space of the constrained process and determining whether the monitored process contains malware based at least in part on the observed interactions.

16. The computer-implemented method of claim 15, further comprising:
determining package files, the package files being associated with the software package, wherein a file created at least in part by a package file is deemed a package file; and wherein the monitored process comprises a process that executes code from a package file.

17. The computer-implemented method of claim 15, wherein determining whether the monitored process contains malware further comprises:
detecting the monitored process injecting code into the address space of the constrained process; and
determining that the monitored process contains malware responsive at least in part to the detection.

18. The computer-implemented method of claim 15, further comprising:
detecting when a monitored process requests access to a kernel object; and
providing a constrained kernel object to the monitored process in response to a request for a kernel object, the constrained kernel object having less functionality than the kernel object.

19. The computer-implemented method of claim 15, further comprising:
determining when an unmonitored process accesses the software package; and
adding the unmonitored process to the set of monitored processes responsive to the determination.

20. The computer-implemented method of claim 15, wherein updating the constrained process comprises:
detecting termination of the system process; and
terminating the constrained process responsive to detecting termination of the system process.

21. The computer-implemented method of claim 15, wherein updating the constrained process comprises:
detecting spawning of a new process by the system process; and
spawning a new constrained process by the constrained process responsive to the detected spawning.

* * * * *